(12) United States Patent
Tsujiuchi et al.

(10) Patent No.: US 9,662,607 B2
(45) Date of Patent: May 30, 2017

(54) $CO_2$ RECOVERY UNIT AND $CO_2$ RECOVERY METHOD

(71) Applicants: MITSUBISHI HEAVY INDUSTRIES, LTD., Tokyo (JP); THE KANSAI ELECTRIC POWER CO., INC., Osaka-shi, Osaka (JP)

(72) Inventors: Tatsuya Tsujiuchi, Tokyo (JP); Hiromitsu Nagayasu, Tokyo (JP); Takuya Hirata, Tokyo (JP); Keiji Fujikawa, Tokyo (JP); Tetsuya Imai, Tokyo (JP); Hiroshi Tanaka, Tokyo (JP); Tsuyoshi Oishi, Tokyo (JP); Masahiko Tatsumi, Hyogo (JP); Yasuyuki Yagi, Hyogo (JP); Kazuhiko Kaibara, Hyogo (JP)

(73) Assignees: MITSUBISHI HEAVY INDUSTRIES, LTD., Tokyo (JP); THE KANSAI ELECTRIC POWER CO., INC., Osaka-shi (JP)

( * ) Notice: Subject to any disclaimer, the term of this patent is extended or adjusted under 35 U.S.C. 154(b) by 0 days.

(21) Appl. No.: 15/170,035

(22) Filed: Jun. 1, 2016

(65) Prior Publication Data
US 2016/0271557 A1 Sep. 22, 2016

Related U.S. Application Data

(62) Division of application No. 13/580,469, filed as application No. PCT/JP2011/050285 on Jan. 11, 2011, now Pat. No. 9,383,101.

(30) Foreign Application Priority Data

Feb. 23, 2010 (JP) .................................. 2010-037790

(51) Int. Cl.
*B01D 53/14* (2006.01)
*F23J 15/04* (2006.01)
(Continued)

(52) U.S. Cl.
CPC ..... B01D 53/1425 (2013.01); B01D 53/1475 (2013.01); F23J 15/006 (2013.01);
(Continued)

(58) Field of Classification Search
CPC ............ B01D 53/1425; B01D 53/1475; B01D 2252/204; B01D 2257/302;
(Continued)

(56) References Cited

U.S. PATENT DOCUMENTS 4,206,722 A * 6/1980 Nolley, Jr. ............. F23J 15/006
110/302
4,364,915 A * 12/1982 Proctor .............. B01D 53/1475
423/219
(Continued)

FOREIGN PATENT DOCUMENTS

GB 2465449 A 5/2010
JP 03-193116 A 8/1991
(Continued)

OTHER PUBLICATIONS

Japanese Office Action dated Dec. 3, 2013, in corresponding Japanese Application No. 2010-037790 w/English Translation (6 pages).
(Continued)

*Primary Examiner* — Amber R Orlando
*Assistant Examiner* — Britanny Precht
(74) *Attorney, Agent, or Firm* — Westerman, Hattori, Daniels & Adrian, LLP

(57) ABSTRACT

A $CO_2$ recovery unit includes an absorber that reduces $CO_2$ in flue gas (101) discharged from a combustion facility (50) by absorbing $CO_2$ by an absorbent, a regenerator that heats
(Continued)

the absorbent having absorbed $CO_2$ to emit $CO_2$, and regenerates and supplies the absorbent to the absorber, and a regenerating heater that uses steam (106) supplied from the combustion facility (50) for heating the absorbent in the regenerator and returns heated condensed water (106a) to the combustion facility (50). The $CO_2$ recovery unit further includes a condensed water/flue gas heat exchanger (57) that heats the condensed water (106a) to be returned from the regenerating heater to the combustion facility (50) by heat-exchanging the condensed water (106a) with the flue gas (101) in a flue gas duct (51) in the combustion facility (50).

5 Claims, 8 Drawing Sheets

(51) Int. Cl.
    *F23L 15/04*     (2006.01)
    *F23L 7/00*     (2006.01)
    *F23J 15/06*     (2006.01)
    *F23J 15/00*     (2006.01)

(52) U.S. Cl.
    CPC ............... *F23J 15/04* (2013.01); *F23J 15/06* (2013.01); *F23L 7/002* (2013.01); *F23L 15/04* (2013.01); *B01D 2252/204* (2013.01); *B01D 2257/302* (2013.01); *B01D 2258/0283* (2013.01); *F23G 2207/104* (2013.01); *F23J 2215/20* (2013.01); *F23J 2219/40* (2013.01); *Y02C 10/06* (2013.01); *Y02E 20/326* (2013.01); *Y02E 20/348* (2013.01)

(58) Field of Classification Search
    CPC .. B01D 2258/0283; F23J 15/006; F23J 15/04; F23J 15/06; F23J 2215/20; F23J 2219/40; F23L 15/04; F23L 7/002; F23G 2207/104; Y02C 10/06; Y02E 20/348
    See application file for complete search history.

(56) References Cited

U.S. PATENT DOCUMENTS

| | | | | |
|---|---|---|---|---|
| 4,416,325 | A * | 11/1983 | Barratt | F23L 15/04 110/254 |
| 4,483,391 | A * | 11/1984 | Gilbert | F23L 15/04 165/108 |
| 4,487,139 | A * | 12/1984 | Warner | B01D 53/002 110/215 |
| 8,647,421 | B2 * | 2/2014 | Yonekawa | B01D 53/1425 95/183 |
| 9,383,101 | B2 * | 7/2016 | Tsujiuchi | B01D 53/1425 |
| 2008/0178733 | A1 * | 7/2008 | Gal | B01D 53/1456 95/9 |
| 2009/0291874 | A1 * | 11/2009 | Bara | C11D 7/3209 510/175 |
| 2010/0170397 | A1 * | 7/2010 | Padban | B01D 53/62 95/183 |
| 2010/0251975 | A1 * | 10/2010 | Mattison | F22D 1/36 122/1 C |
| 2011/0061529 | A1 * | 3/2011 | Von Trotha | B01D 53/0476 95/99 |
| 2011/0094381 | A1 * | 4/2011 | Lichtfers | B01D 53/1475 95/187 |
| 2011/0107916 | A1 * | 5/2011 | Inoue | B01D 53/1418 96/242 |
| 2012/0234177 | A1 * | 9/2012 | Yonekawa | B01D 53/1425 96/242 |
| 2012/0285171 | A1 * | 11/2012 | Iijima | B01D 53/1425 60/670 |
| 2012/0318141 | A1 * | 12/2012 | Tsujiuchi | B01D 53/1425 95/179 |

FOREIGN PATENT DOCUMENTS

| | | |
|---|---|---|
| JP | 05-245339 A | 9/1993 |
| JP | 2001-239129 A | 9/2001 |
| JP | 2007-222736 A | 9/2007 |
| JP | 2007-284273 A | 11/2007 |
| JP | 2009-221574 A | 10/2009 |
| JP | 2009-247932 A | 10/2009 |
| JP | 2010-085078 A | 4/2010 |
| JP | 2010-227742 A | 10/2010 |

OTHER PUBLICATIONS

International Search Report of PCT/JP2011/050285, mailing date Apr. 19, 2011.
Written Opinion of PCT/JP2011/050285, mailing date Apr. 19, 2011.
Notice of Allowance dated Jun. 7, 2013, issued in corresponding Canadian Patent Application No. 2,788,346.
Japanese Decision of a Patent Grant dated Sep. 24, 2014, issued in corresponding Japanese Application No. 2010-037790 w/English translation (3 pages).
Australian Notice of Acceptance dated Dec. 13, 2013, issued in corresponding Australian Patent Application No. 2011219266 (3 pages).
Machine Design, "Basics of Heat Exchanger Design", Nov. 15, 2002, p. 2, Accessed Mar. 9, 2015 https://web.archive.org/web/20140325082948/http://machinedesign.com/basics-design/heat-exchangers.

* cited by examiner

FIG. 8

| | | COMPARATIVE EXAMPLE 1 | EXAMPLE 1 | EXAMPLE 2 | EXAMPLE 3 | EXAMPLE 4 |
|---|---|---|---|---|---|---|
| POWER OUTPUT [MW] | | 791 | 796 | 798 | 803 | 803 |
| REDUCTION IN POWER OUTPUT [%] | | 12.1 % | 11.6 % | 11.3 % | 10.8 % | 10.8 % |
| CONDENSED WATER TEMPERATURE [°C] | OUTLET OF CO₂ RECOVERY UNIT (1) | 100 | 100 | 100 | 100 | 100 |
| | CONDENSED WATER OUTLET OF AIR PREHEATER (9) | — | — | — | — | 63 |
| | CONDENSED WATER INLET OF COMBUSTION FACILITY (2) | 100 | 126 | 126 | 154 | 157 |
| GAS TEMPERATURE [°C] | FLUE GAS INLET OF AIR PREHEATER (10) | — | — | 30 | 30 | 30 |
| | AIR INLET OF AIR/FLUE GAS HEAT EXCHANGER (3) | 30 | 30 | 30 | 70 | 70 |
| | AIR INLET OF COMBUSTION FACILITY (4) | 330 | 330 | 330 | 335 | 335 |
| | FLUE GAS OUTLET OF COMBUSTION FACILITY (5) | 362 | 362 | 362 | 362 | 362 |
| | FLUE GAS INLET OF CONDENSED WATER/FLUE GAS HEAT EXCHANGER (6) | 142 | 142 | 142 | 169 | 169 |
| | FLUE GAS OUTLET OF CONDENSED WATER/FLUE GAS HEAT EXCHANGER (7) | — | 120 | 120 | 123 | 89 |
| | FLUE GAS OUTLET OF CIRCULATING WATER/FLUE GAS HEAT EXCHANGER (8) | — | — | 105 | — | — |
| ABSORBENT INLET TEMPERATURE OF REGENERATOR [°C] | | 90.5 | 90.5 | 93.8 | 90.5 | 90.5 |

$CO_2$ RECOVERY UNIT AND $CO_2$ RECOVERY METHOD

CROSS REFERENCE TO RELATED APPLICATIONS

This is a divisional of U.S. application Ser. No. 13/580,469, filed Aug. 22, 2012, which is a 371 of PCT/JP2011/050285 filed Jan. 11, 2011, which claims priority to JP 2010-037790, filed Feb. 23, 2010, the entire contents of which is incorporated herein by reference.

FIELD

The present invention relates to a $CO_2$ recovery unit and a $CO_2$ recovery method for promoting energy savings.

BACKGROUND

The greenhouse effect by $CO_2$ (carbon dioxide) has been pointed out as one of the causes of the global warming, and there is an urgent need to take measures against it for protecting the global environment on a global scale. The generation source of $CO_2$ ranges over all human activities that burn fossil fuel, and thus demands for emission limitation on $CO_2$ are further increasing. Along with this trend, targeting for power generating facilities such as a thermal power plant that uses a large amount of fossil fuel, a method of reducing and recovering $CO_2$ in flue gas by bringing flue gas from a boiler into contact with an amine absorbent such as an amine compound solution has been intensively studied.

As a $CO_2$ recovery unit that recovers $CO_2$ from flue gas from a boiler or the like by using an absorbent, there has been known a $CO_2$ recovery unit that reduces $CO_2$ in flue gas by bringing flue gas into contact with a $CO_2$ absorbent in an absorber, heats the absorbent that has absorbed $CO_2$ in a regenerator so as to emit $CO_2$ and to regenerate the absorbent, and then returns the absorbent to the absorber and reuses the absorbent (see, for example, Patent Literature 1).

To separate and recover $CO_2$ in the regenerator, the absorbent needs to be heated in a reboiler, and thus steam of a predetermined pressure for heating needs to be supplied. Conventionally, it has been proposed to regenerate the steam by using a part of steam generated in a combustion facility such as a boiler in a power plant (see, for example, Patent Literature 2).

Steam supplied to the regenerator becomes condensed water after heating the absorbent that has absorbed $CO_2$, and is returned to a combustion facility and heated again.

CITATION LIST

Patent Literatures

Patent Literature 1: Japanese Patent Application Laid-open No. H5-245339
Patent Literature 2: Japanese Utility Model Laid-open Publication No. H3-193116

SUMMARY

Technical Problem

As described above, a $CO_2$ recovery unit is installed while being added to a combustion facility, and consumes thermal energy of the combustion facility. Therefore, there is a problem that energy efficiency of the combustion facility is lowered. For example, in the case of a power generating facility, thermal energy of the power generating facility is consumed, thereby lowering a power output thereof.

The present invention has been achieved in view of the above problems, and an object of the present invention is to provide a $CO_2$ recovery unit and a $CO_2$ recovery method that can improve energy efficiency.

Solution to Problem

According to an aspect of the present invention, an $CO_2$ recovery unit includes: an absorber that reduces $CO_2$ in flue gas discharged from a combustion facility by absorbing $CO_2$ by an absorbent; a regenerator that heats the absorbent having absorbed $CO_2$ to emit $CO_2$, and regenerates and supplies the absorbent to the absorber; a regenerating heater that uses steam supplied from the combustion facility for heating the absorbent in the regenerator and returns heated condensed water to the combustion facility; and a condensed water/flue gas heat exchanger that heats condensed water to be returned from the regenerating heater to the combustion facility by heat-exchanging the condensed water with flue gas in a flue gas duct in the combustion facility.

According to the $CO_2$ recovery unit, because condensed water returned from the regenerating heater to the combustion facility by the condensed water/flue gas heat exchanger is preheated, consumption energy in the combustion facility can be reduced, thereby enabling to improve energy efficiency in a plant in which the $CO_2$ recovery unit is applied.

Advantageously, in the $CO_2$ recovery unit, a condensed water/flue gas heat exchanging line for heat-exchanging between condensed water and flue gas is provided in middle of a condensed water line for returning condensed water from the regenerating heater to the combustion facility, and a bypass line for directly connecting the condensed water line without via the condensed water/flue gas heat exchanging line is provided.

According to the $CO_2$ recovery unit, for example, when there is a load variation in at least one of a plant in which the $CO_2$ recovery unit is applied and the $CO_2$ recovery unit, a heat exchange amount between condensed water and flue gas in the condensed water/flue gas heat exchanger can be adjusted by the bypass line. Accordingly, a stable operation can be performed even at the time of the load variation.

Advantageously, the $CO_2$ recovery unit further includes: a circulating water/flue gas heat exchanger that performs heat exchange between circulating water and flue gas in a flue gas duct in the combustion facility, at a downstream of flue gas of the condensed water/flue gas heat exchanger; and a circulating water/absorbent heat exchanger that performs heat exchange between an absorbent having absorbed $CO_2$ in the absorber and the circulating water before the absorbent reaches the regenerator.

According to the $CO_2$ recovery unit, the absorbent is heated before reaching the regenerator by using heat of flue gas. Therefore, an amount of steam required in the regenerating heater for heating the absorbent can be reduced. Accordingly, consumption energy in the combustion facility required for recovering $CO_2$ can be reduced, thereby enabling to improve energy efficiency in a plant in which the $CO_2$ recovery unit is applied.

Advantageously, the $CO_2$ recovery unit further includes an air preheater that preheats combustion air before reaching the combustion facility by waste heat discharged in a process of recovering $CO_2$.

According to the $CO_2$ recovery unit, combustion air is preheated by using waste heat discharged in the process of recovering $CO_2$. Therefore, the temperature of flue gas discharged from the combustion facility rises, thereby increasing a heat exchange amount in the condensed water/ flue gas heat exchanger. As a result, the temperature of condensed water returned from the regenerating heater to the combustion facility rises, thereby enabling to reduce consumption energy in the combustion facility required for recovering $CO_2$, and to improve energy efficiency in a plant in which the $CO_2$ recovery unit is applied.

Advantageously, the $CO_2$ recovery unit further includes an air preheater that preheats combustion air before reaching the combustion facility by the condensed water before reaching the condensed water/flue gas heat exchanger.

According to the $CO_2$ recovery unit, combustion air is preheated by using condensed water before reaching the condensed water/flue gas heat exchanger. Therefore, the temperature of flue gas discharged from the combustion facility rises, thereby increasing the heat exchange amount in the condensed water/flue gas heat exchanger. As a result, the temperature of condensed water returned from the regenerating heater to the combustion facility rises, thereby enabling to reduce consumption energy in the combustion facility required for recovering $CO_2$, and to improve energy efficiency in a plant in which the $CO_2$ recovery unit is applied.

According to another aspect of the present invention, an $CO_2$ recovery method includes: a $CO_2$ absorbing step of reducing $CO_2$ in flue gas discharged from a combustion facility by absorbing $CO_2$ by an absorbent; an absorbent regenerating step of heating the absorbent having absorbed $CO_2$ to emit $CO_2$, and regenerating and supplying the absorbent to the $CO_2$ absorbing step; a regeneration heating step of using steam supplied from the combustion facility for heating the absorbent at the absorbent regenerating step and returning heated condensed water to the combustion facility, and reusing the regenerated absorbent at the $CO_2$ absorbing step; and a condensed water/flue gas heat exchanging step of heating condensed water to be returned to the combustion facility by heat-exchanging the condensed water with flue gas in a flue gas duct in the combustion facility.

According to the $CO_2$ recovery method, because condensed water returned from the regeneration heating step to the combustion facility by the condensed water/flue gas heat exchanging step is preheated, consumption energy in the combustion facility can be reduced, thereby enabling to improve energy efficiency in a plant in which the $CO_2$ recovery unit is applied.

Advantageously, the $CO_2$ recovery unit further includes a non-heat exchanging step of returning condensed water to the combustion facility without via the condensed water/flue gas heat exchanging step.

According to the $CO_2$ recovery method, for example, when there is a load variation in at least one of a plant in which the $CO_2$ recovery unit is applied and the $CO_2$ recovery unit, a heat exchange amount between condensed water and flue gas at the condensed water/flue gas heat exchanging step can be adjusted by the non-heat exchanging step. Accordingly, a stable operation can be performed even at the time of the load variation.

Advantageously, the $CO_2$ recovery unit further includes a circulating water/flue gas heat exchanging step of performing heat exchange between circulating water and flue gas in a flue gas duct in the combustion facility, at a downstream of flue gas of the condensed water/flue gas heat exchanging step; and a circulating water/absorbent heat exchanging step of performing heat exchange between an absorbent having absorbed $CO_2$ at the $CO_2$ absorbing step and the circulating water before performing the absorbent regenerating step.

According to the $CO_2$ recovery method, the absorbent is heated before performing the absorbent regenerating step by using heat of flue gas. Therefore, an amount of steam required for the regeneration heating step for heating the absorbent can be reduced. Accordingly, consumption energy in the combustion facility required for recovering $CO_2$ can be reduced, thereby enabling to improve energy efficiency in a plant in which the $CO_2$ recovery unit is applied.

Advantageously, the $CO_2$ recovery unit further includes an air preheating step of preheating combustion air before reaching the combustion facility by waste heat discharged in a process of recovering $CO_2$.

According to the $CO_2$ recovery method, combustion air is preheated by using waste heat discharged in the process of recovering $CO_2$. Therefore, the temperature of flue gas discharged from the combustion facility rises, thereby increasing a heat exchange amount at the condensed water/ flue gas heat exchanging step. As a result, the temperature of condensed water returned from the regenerating heater to the combustion facility rises, thereby enabling to reduce consumption energy in the combustion facility required for recovering $CO_2$, and to improve energy efficiency in a plant in which the $CO_2$ recovery unit is applied.

Advantageously, the $CO_2$ recovery unit further includes an air preheating step of preheating combustion air before reaching the combustion facility by the condensed water before performing the condensed water/flue gas heat exchanging step.

According to the $CO_2$ recovery method, combustion air is preheated by using condensed water before reaching the condensed water/flue gas heat exchanging step. Therefore, the temperature of flue gas discharged from the combustion facility rises, thereby increasing the heat exchange amount at the condensed water/flue gas heat exchanging step. As a result, the temperature of condensed water returned from the regenerating heater to the combustion facility rises, thereby enabling to reduce consumption energy in the combustion facility required for recovering $CO_2$, and to improve energy efficiency in a plant in which the $CO_2$ recovery unit is applied.

Advantageous Effects of Invention

According to the present invention, consumption energy in a combustion facility is reduced and energy efficiency thereof can be improved.

BRIEF DESCRIPTION OF DRAWINGS

FIG. 8 depicts a power output reduction rate of a thermal power generating facility according to Examples of the present invention.

DESCRIPTION OF EMBODIMENTS

Embodiments of the present invention will be explained below in detail with reference to the accompanying drawings. The present invention is not limited to the embodiments. In addition, constituent elements in the embodiments include those that can be easily replaced or assumed by persons skilled in the art, or that are substantially equivalent.

First Embodiment

Figure 1:
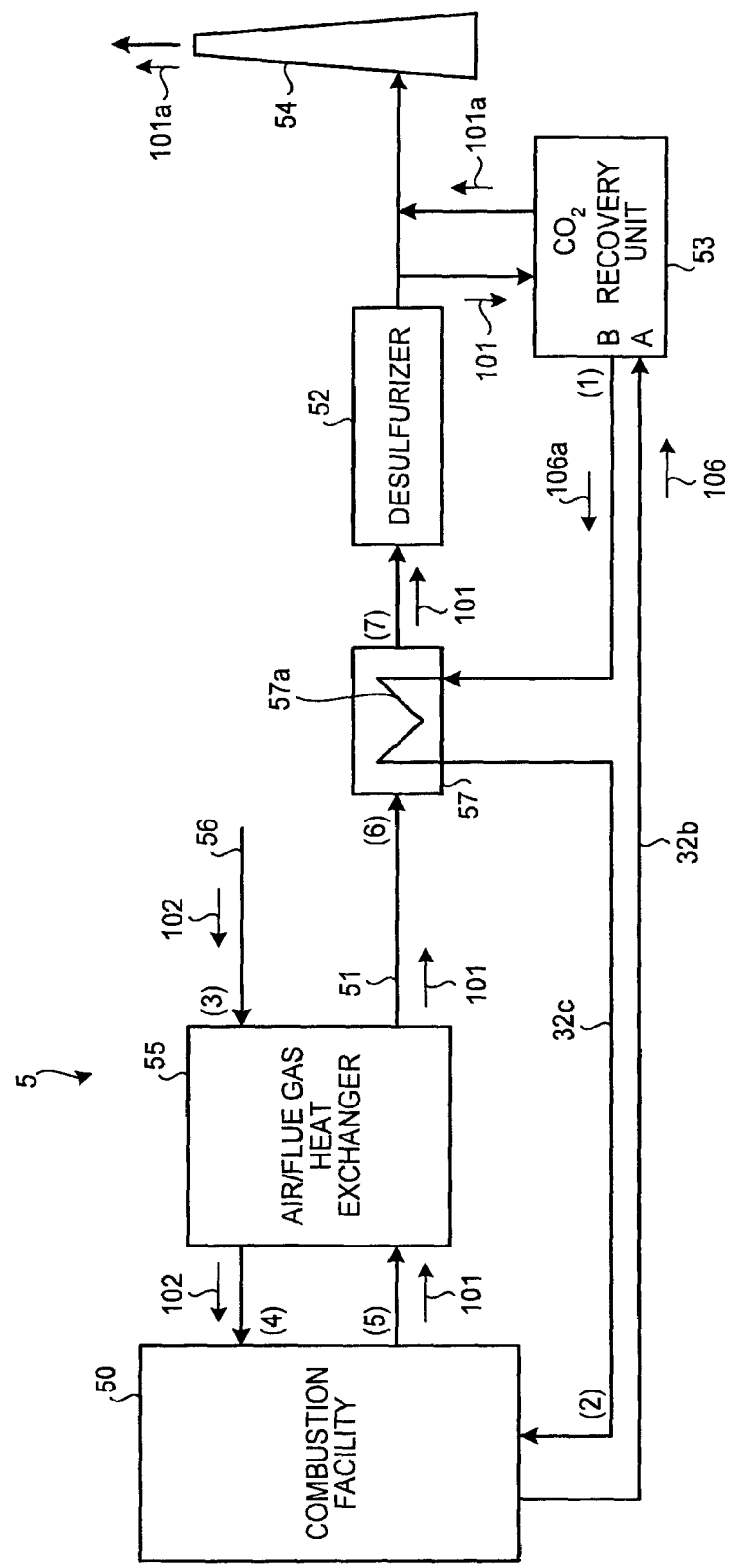
FIG. 1 is a schematic diagram of a plant in which a $CO_2$ recovery unit according to a first embodiment of the present invention is applied.
Figure 2:
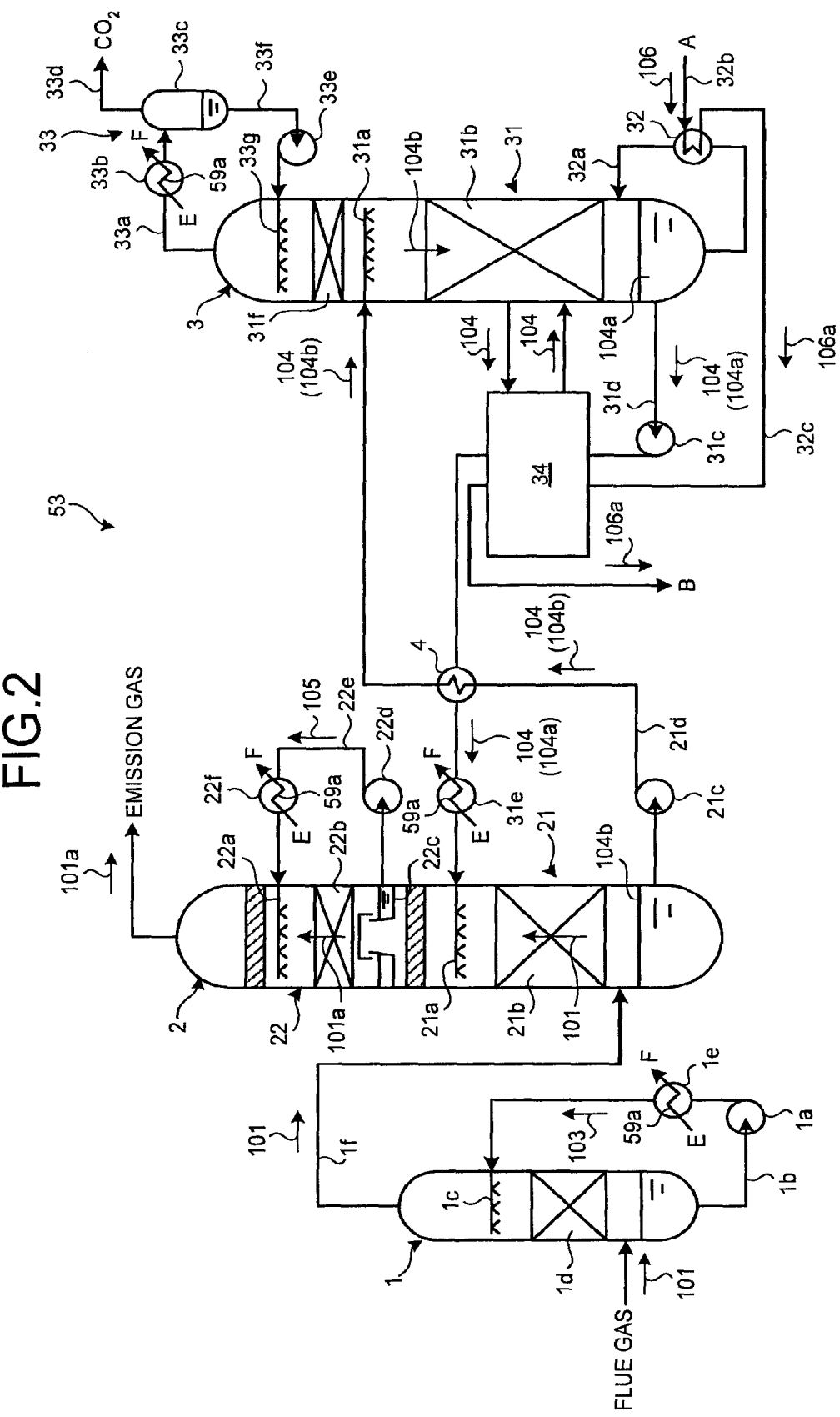
FIG. 2 is a schematic diagram of the $CO_2$ recovery unit according to the first embodiment of the present invention.

A first embodiment of the present invention is explained with reference to the drawings. FIG. 1 is a schematic diagram of a plant in which a $CO_2$ recovery unit according to the first embodiment is applied. FIG. 2 is a schematic diagram of the $CO_2$ recovery unit according to the first embodiment.

As shown in FIG. 1, a plant 5, for example, a power generation plant mainly includes a boiler that heats water in a sealed vessel by the thermal energy acquired by burning fuel, thereby acquiring high-temperature and high-pressure superheated steam, a combustion facility 50 including various turbines that acquire rotative power by superheated steam from the boiler, and a power generator (not shown) that generates power by the rotative power of a steam turbine. Although not shown in FIG. 1, the turbine includes a high pressure turbine, an intermediate pressure turbine, and a low pressure turbine. The plant 5 further includes a desulfurizer 52 that reduces sulfur content (including a sulfur compound) contained in flue gas 101 in a flue gas duct 51 for the passage of the flue gas 101 discharged from the boiler in the combustion facility 50, and a $CO_2$ recovery unit 53 that reduces $CO_2$ (carbon dioxide) contained in the flue gas 101 discharged from the boiler in the combustion facility 50. That is, a power generation plant as the plant 5 generates power by superheated steam from the boiler in the combustion facility 50, and discharges from a stack 54 emission gas 101a, from which sulfur content and $CO_2$ discharged from the boiler in the combustion facility 50 are reduced.

In this type of plant 5, the boiler in the combustion facility 50 is provided with an air/flue gas heat exchanger 55. The air/flue gas heat exchanger 55 is provided while bridging an air line 56 that supplies combustion air 102 to the boiler in the combustion facility 50 and the flue gas duct 51, and performs heat exchange between the flue gas 101 discharged from the boiler and the combustion air 102 supplied to the boiler. The air/flue gas heat exchanger 55 improves the thermal efficiency of the boiler by preheating the combustion air 102 to the boiler.

As shown in FIG. 2, the $CO_2$ recovery unit 53 includes a cooling column 1 that cools the flue gas 101 discharged from the boiler in the combustion facility 50 by cooling water 103, an absorber 2 that causes a lean solution 104a of an absorbent 104, which is an aqueous solution of an amine compound that absorbs $CO_2$, to be brought into countercurrent contact with the flue gas 101 to absorb $CO_2$ in the flue gas 101 by the absorbent 104 and discharges the emission gas 101a from which $CO_2$ is reduced, and a regenerator 3 that emits $CO_2$ from a rich solution 104b of the absorbent 104 having absorbed $CO_2$ to regenerate it to the lean solution 104a, and returns the lean solution 104a to the absorber 2.

In the cooling column 1, the flue gas 101 containing $CO_2$ is boosted by a flue gas blower (not shown) and fed into the cooling column 1, and is brought into countercurrent contact with the cooling water 103, thereby cooling the flue gas 101.

The cooling water 103 is accumulated in a lower portion of the cooling column 1, pressure-fed by a cooling-water circulating pump 1a, and supplied to an upper portion of the cooling column 1 through a cooling water line 1b. The cooling water 103 is then brought into countercurrent contact with the flue gas 101 moving upward at a position of a packed bed 1d provided in a process leading to the lower portion of the cooling column 1, while flowing down from a nozzle 1c provided in the upper portion of the cooling column 1. Furthermore, a cooler 1e is provided in the cooling water line 1b, and by cooling the cooling water 103 to a temperature lower than that of the flue gas 101, a part of moisture in the flue gas 101 condenses in the cooling column 1 to become condensed water. The flue gas 101 cooled in the cooling column 1 is discharged from a top portion of the cooling column 1 through a flue gas line if and supplied to the absorber 2.

The absorber 2 has a $CO_2$ absorbing unit 21 in a lower portion thereof, and a water-washing unit 22 in an upper portion thereof. The $CO_2$ absorbing unit 21 brings the flue gas 101 supplied from the cooling column 1 into countercurrent contact with the lean solution 104a of the absorbent 104, so that $CO_2$ in the flue gas 101 is absorbed by the absorbent 104 and reduced ($CO_2$ absorbing step).

The lean solution 104a of the absorbent 104 is supplied from the regenerator 3, and brought into countercurrent contact with the flue gas 101 moving upward at a position of a packed bed 21b provided in a process leading to the lower portion of the absorber 2, while flowing down from a nozzle 21a, to become the rich solution 104b having absorbed $CO_2$, and then accumulated at a bottom portion of the absorber 2. The rich solution 104b of the absorbent 104 accumulated at the bottom portion of the absorber 2 is then pressure-fed by a rich-solution discharge pump 21c positioned outside of the absorber 2, and supplied to the regenerator 3 through a rich solution line 21d. Furthermore, in the process of being supplied to the regenerator 3 through the rich solution line 21d, the rich solution 104b of the absorbent 104 is heat-exchanged with the lean solution 104a of the absorbent 104 in the process of being supplied to the absorber 2 through a lean solution line 31d described later, by a rich/lean heat exchanger 4.

The water-washing unit 22 brings the emission gas 101a, from which $CO_2$ is reduced by the $CO_2$ absorbing unit 21, into countercurrent contact with wash water 105 to reduce the amine compound entrained with the emission gas 101a by the wash water 105, and discharges the emission gas 101a, from which the amine compound is reduced, to outside of the absorber 2.

The wash water 105 is brought into countercurrent contact with the emission gas 101a moving upward at a position of a packed bed 22b provided in a process leading to the lower part of the absorber 2, while flowing down from a nozzle 22a, and is accumulated in a water receiver 22c. The wash water 105 accumulated in the water receiver 22c is then pressure-fed by a wash-water discharge pump 22d positioned outside of the absorber 2, cooled by a cooler 22f, while being circulated through a wash water line 22e, and caused to flow down from the nozzle 22a again.

The regenerator 3 has an absorbent regenerating unit 31 in a lower half thereof. The absorbent regenerating unit 31 recovers $CO_2$ from the rich solution 104b of the absorbent 104 and regenerates it as the lean solution 104a, thereby emitting $CO_2$ from the absorbent 104 having absorbed $CO_2$ (absorbent regenerating step).

The rich solution 104b of the absorbent 104 is supplied through the rich solution line 21d of the $CO_2$ absorbing unit 21 in the absorber 2, and caused to flow down from a nozzle 31a. The rich solution 104b then becomes the lean solution 104a, from which almost all $CO_2$ has been emitted, due to an endothermic reaction by a regenerating heater 32 connected to a lower portion of the regenerator 3, while passing through a lower-portion packed bed 31b provided in a process leading to the lower portion of the regenerator 3, and accumulated at a bottom portion of the regenerator 3. Subsequently, in a process of being pressure-fed by a lean-solution discharge pump 31c positioned outside of the regenerator 3, and supplied to the absorber 2 through the lean solution line 31d, the lean solution 104a accumulated at the lower portion of the regenerator 3 is heat-exchanged with the rich solution 104b in the process of being supplied to the regenerator 3 through the rich solution line 21d by the rich/lean heat exchanger 4, and cooled by a cooler 31e.

Meanwhile, the emitted $CO_2$ moves upward in the regenerator 3, passes through an upper-portion packed bed 31f, and discharged from a top portion of the regenerator 3. At this time, because moisture is contained in $CO_2$, by cooling $CO_2$ in a cooler 33b, the moisture contained in $CO_2$ is condensed, and the condensed water and $CO_2$ are separated by a $CO_2$ separator 33c. High-purity $CO_2$ separated from condensed water is emitted from a $CO_2$ emission line 33d to outside of a system of a $CO_2$ recovery process, and used or dispensed with in subsequent steps. The condensed water is transported by a condensed water pump 33e, a part of which is supplied from a nozzle 33g at a top part of the regenerator 3 into the regenerator 3, through a regenerator reflux-water line 33f.

The regenerating heater 32 heats the absorbent 104 accumulated at the bottom portion of the regenerator 3 by steam 106, in a circulating process for returning the absorbent 104 to the bottom portion of the regenerator 3, while extracting the absorbent 104 to outside of the regenerator 3 via a heating line 32a. The steam 106 supplied to the regenerating heater 32 by a steam extracting line 32b is condensed to become condensed water 106a after heating the absorbent 104, and discharged via a condensed water line 32c (regeneration heating step).

Furthermore, the absorbent regenerating unit 31 is provided with a lean solution/condensed water heat recovery unit 34. The lean solution/condensed water heat recovery unit 34 performs heat exchange among the extracted absorbent 104 and the lean solution 104a of the absorbent 104 in a process of being supplied to the absorber 2 through the lean solution line 31d and the condensed water 106a in a process of being discharged through the condensed water line 32c, in the circulating process for returning the absorbent 104 in the process of being regenerated in the absorbent regenerating unit 31 to the regenerator 3, while extracting the absorbent 104 to outside of the regenerator 3.

In the $CO_2$ recovery unit 53 described above, in the regenerating heater 32 (regeneration heating step), as shown in FIG. 1, the steam 106 supplied to the regenerating heater 32 is extracted from the combustion facility 50 in the plant 5 via the steam extracting line 32b (the sign A in FIG. 1 and FIG. 2). Furthermore, in the $CO_2$ recovery unit 53, the condensed water 106a after being used for heating the absorbent 104 in the regenerating heater 32 is returned to the boiler in the combustion facility 50 via the condensed water line 32c (the sign B in FIG. 1 and FIG. 2). The condensed water 106a to be returned to the boiler in the combustion facility 50 from the regenerating heater 32 in the $CO_2$ recovery unit 53 via the condensed water line 32c is returned to the boiler in the combustion facility 50, while dissolved oxygen is removed by a deaerator (not shown).

As shown in FIG. 1, a condensed water/flue gas heat exchanging line 57a is put in the condensed water line 32c. The condensed water/flue gas heat exchanging line 57a is extended to the flue gas duct 51 disposed between the air/flue gas heat exchanger 55 and the desulfurizer 52 to form a condensed water/flue gas heat exchanger 57 (condensed water/flue gas heat exchanging step) that heats the condensed water 106a to be returned from the regenerating heater 32 to the combustion facility 50 by heat-exchanging the condensed water 106a with the flue gas 101 in the flue gas duct 51.

As described above, the $CO_2$ recovery unit 53 according to the first embodiment includes the absorber 2 that reduces $CO_2$ in the flue gas 101 discharged from the combustion facility 50 by absorbing $CO_2$ by the lean solution 104a of the absorbent 104, the regenerator 3 that heats the rich solution 104b of the absorbent 104 having absorbed $CO_2$ to emit $CO_2$, and regenerates and supplies the absorbent to the absorber 2, and the regenerating heater 32 that uses the steam 106 supplied from the combustion facility 50 for heating the absorbent 104 in the regenerator 3 and returns the heated condensed water 106a to the combustion facility 50. The $CO_2$ recovery unit further includes the condensed water/flue gas heat exchanger 57 that heats the condensed water 106a to be returned from the regenerating heater 32 to the combustion facility 50 by heat-exchanging the condensed water 106a with the flue gas 101 in the flue gas duct 51 in the combustion facility 50.

According to the $CO_2$ recovery unit 53, because the condensed water 106a to be returned from the regenerating heater 32 to the combustion facility 50 is preheated by the condensed water/flue gas heat exchanger 57, consumption energy in the combustion facility 50 can be reduced, thereby enabling to improve energy efficiency in the plant 5 in which the $CO_2$ recovery unit 53 is applied.

Figure 3:
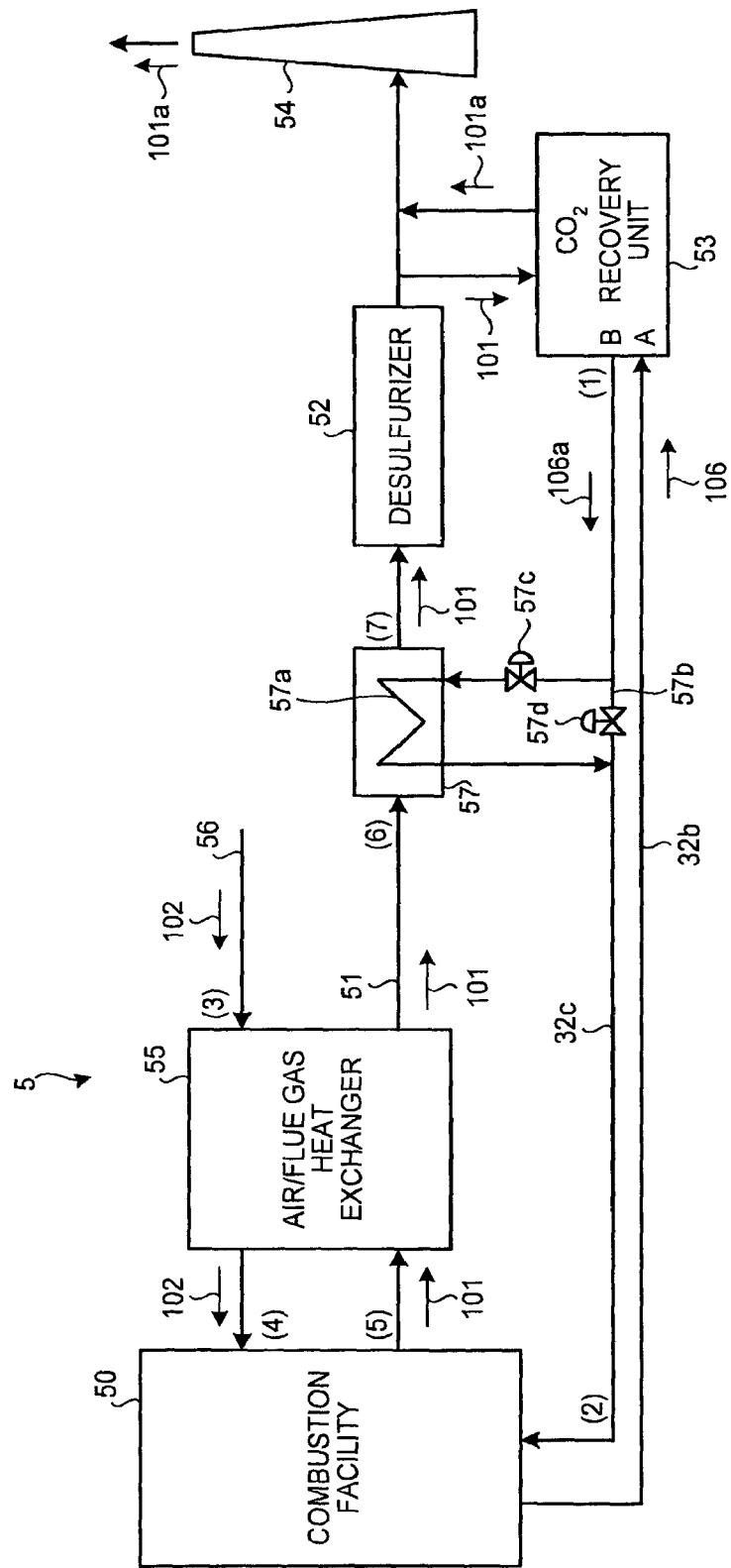
FIG. 3 is a schematic diagram of a plant in which a $CO_2$ recovery unit according to another mode of the first embodiment of the present invention is applied.

FIG. 3 depicts another mode of the $CO_2$ recovery unit 53 according to the first embodiment. As shown in FIG. 3, a bypass line 57b that directly connects the condensed water line 32c without via the condensed water/flue gas heat exchanging line 57a is provided in the condensed water line 32c for returning the condensed water 106a from the regenerating heater 32 to the combustion facility 50. Furthermore, an on-off valve 57c is provided on an upstream side of the condensed water/flue gas heat exchanging line 57a for feeding the condensed water 106a to the condensed water/flue gas heat exchanger 57. Further, an on-off valve 57d is provided in the bypass line 57b.

When heat exchange between the condensed water 106a and the flue gas 101 is performed in the condensed water/flue gas heat exchanger 57, the on-off valve 57c is opened, and the on-off valve 57d is closed. With this configuration, the condensed water 106a in a process of being returned to the combustion facility 50 via the condensed water line 32c passes through the condensed water/flue gas heat exchanging line 57a. Therefore, heat exchange between the condensed water 106a and the flue gas 101 is performed in the condensed water/flue gas heat exchanger 57.

On the other hand, when heat exchange between the condensed water 106a and the flue gas 101 is not performed in the condensed water/flue gas heat exchanger 57, the on-off valve 57c is closed, and the on-off valve 57d is opened. With this configuration, the condensed water 106a in the process of being returned to the combustion facility 50 via the condensed water line 32c is returned to the combustion facility 50 without via the condensed water/flue gas heat exchanging line 57a. Therefore, heat exchange between the condensed water 106a and the flue gas 101 is not performed in the condensed water/flue gas heat exchanger 57 (non-heat exchanging step).

As described above, in the $CO_2$ recovery unit 53 according to the first embodiment, the condensed water/flue gas heat exchanging line 57a for performing heat exchange between the condensed water 106a and the flue gas 101 is provided in the middle of the condensed water line 32c for returning the condensed water 106a from the regenerating heater 32 to the combustion facility 50, and the bypass line 57b for directly connecting the condensed water line 32c without via the condensed water/flue gas heat exchanging line 57a is provided.

According to the $CO_2$ recovery unit 53, for example, when there is a load variation in at least one of the plant 5 and the $CO_2$ recovery unit 53, the heat exchange amount between the condensed water 106a and the flue gas 101 in the condensed water/flue gas heat exchanger 57 can be adjusted by the bypass line 57b. Accordingly, a stable operation can be performed even at the time of the load variation.

A $CO_2$ recovery method according to the first embodiment includes a $CO_2$ absorbing step of reducing $CO_2$ in the flue gas 101 discharged from the combustion facility 50 by absorbing $CO_2$ by the rich solution 104b of the absorbent 104, an absorbent regenerating step of heating the rich solution 104b of the absorbent 104 having absorbed $CO_2$ to emit $CO_2$, and regenerating and supplying the absorbent to the $CO_2$ absorbing step, and a regeneration heating step of using the steam 106 supplied from the combustion facility 50 for heating the absorbent 104 at the absorbent regenerating step and returning the heated condensed water 106a to the combustion facility 50. The $CO_2$ recovery method further includes a condensed water/flue gas heat exchanging step of heating the condensed water 106a to be returned to the combustion facility 50 by heat-exchanging the condensed water 106a with the flue gas 101 in the flue gas duct 51 in the combustion facility 50.

According to the $CO_2$ recovery method, because the condensed water 106a to be returned from the regeneration heating step to the combustion facility 50 is preheated by the condensed water/flue gas heat exchanging step, consumption energy in the combustion facility 50 can be reduced, thereby enabling to improve energy efficiency in the plant 5 in which the $CO_2$ recovery method is applied.

Furthermore, the $CO_2$ recovery method according to the first embodiment includes a non-heat exchanging step of returning the condensed water 106a to the combustion facility 50 without via the condensed water/flue gas heat exchanging step.

According to the $CO_2$ recovery method, for example, when there is a load variation in at least one of the plant 5 and the $CO_2$ recovery unit 53, the heat exchange amount between the condensed water 106a and the flue gas 101 at the condensed water/flue gas heat exchanging step can be adjusted by the non-heat exchanging step. Accordingly, a stable operation can be performed even at the time of the load variation.

Second Embodiment

Figure 4:
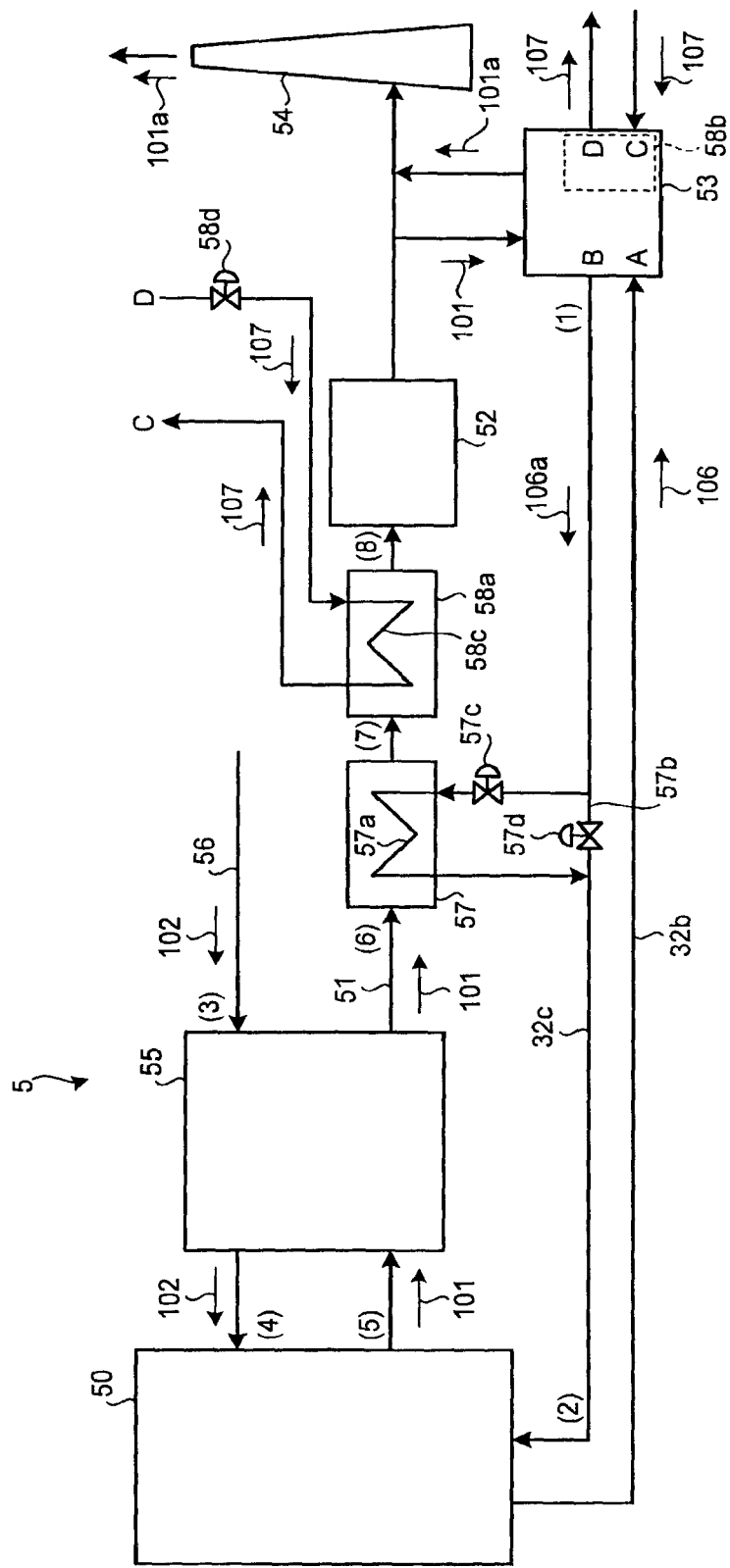
FIG. 4 is a schematic diagram of a plant in which a $CO_2$ recovery unit according to a second embodiment of the present invention is applied.

A second embodiment of the present invention is explained with reference to the drawings. FIG. 4 is a schematic diagram of a plant in which a $CO_2$ recovery unit according to a second embodiment is applied, and FIG. 5 is a schematic diagram of the $CO_2$ recovery unit according to the second embodiment.

The $CO_2$ recovery unit 53 according to the present embodiment includes the condensed water/flue gas heat exchanger 57 (in a $CO_2$ recovery method, condensed water/flue gas heat exchanging step), similarity to the $CO_2$ recovery unit 53 according to the first embodiment. The $CO_2$ recovery unit 53 further includes a circulating water/flue gas heat exchanger 58a (in the $CO_2$ recovery method, circulating water/flue gas heat exchanging step) and a circulating water/absorbent heat exchanger 58b (in the $CO_2$ recovery method, circulating water/absorbent heat exchanging step). Therefore, in the second embodiment, a configuration related to the circulating water/flue gas heat exchanger 58a (in the $CO_2$ recovery method, circulating water/flue gas heat exchanging step) and the circulating water/absorbent heat exchanger 58b (in the $CO_2$ recovery method, circulating water/absorbent heat exchanging step) is explained, and elements equivalent to those in the first embodiment described above are denoted by like reference signs and explanations thereof will be omitted.

As shown in FIG. 4, the circulating water/flue gas heat exchanger 58a is provided in the flue gas duct 51 in a downstream of the flue gas 101 of the condensed water/flue gas heat exchanger 57. More specifically, the circulating water/flue gas heat exchanger 58a is provided between the condensed water/flue gas heat exchanger 57 and the desulfurizer 52 in the flue gas duct 51. The circulating water/flue gas heat exchanger 58a is supplied with circulating water 107 by a circulating water line 58c.

Figure 5:
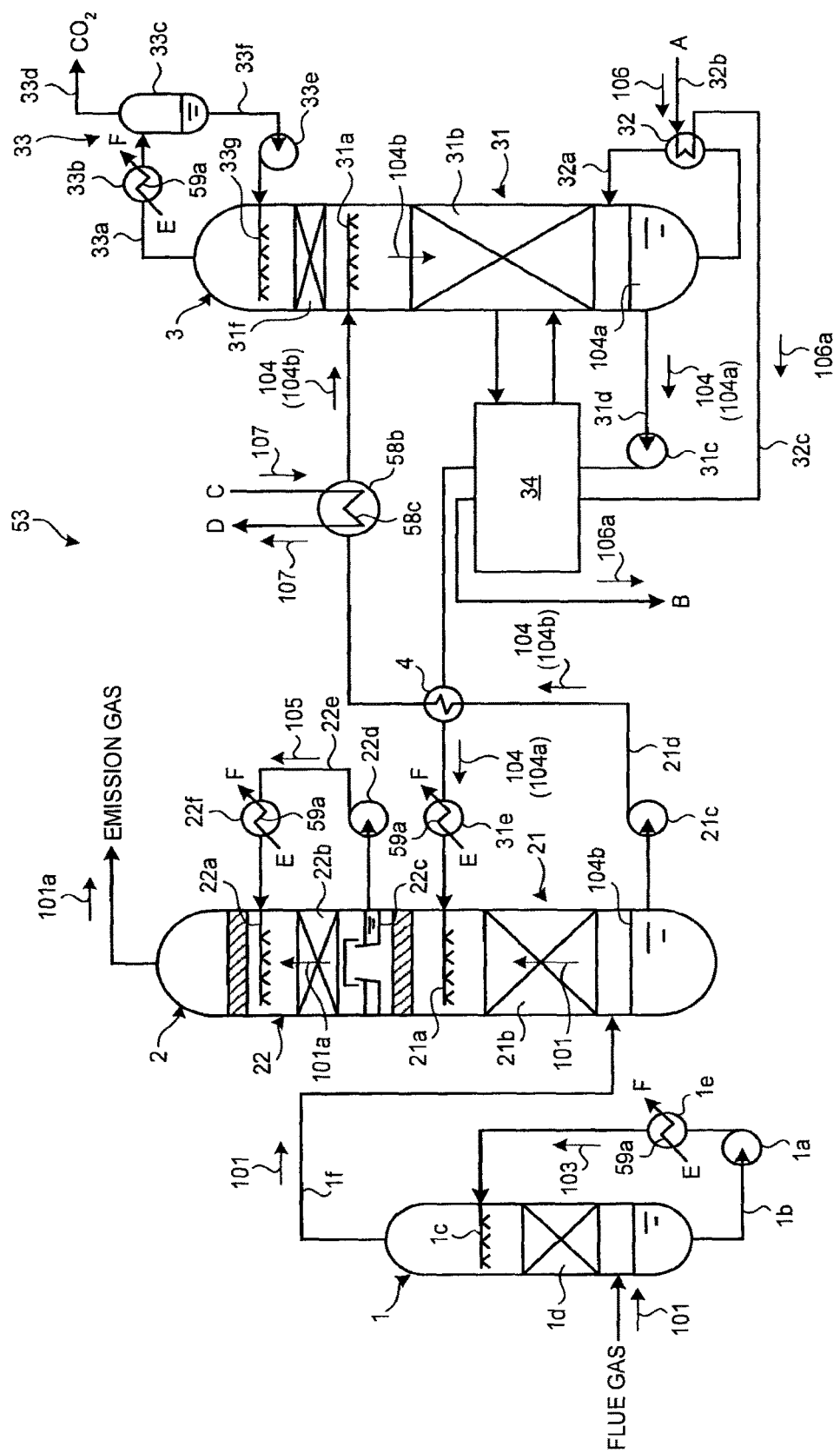
FIG. 5 is a schematic diagram of the $CO_2$ recovery unit according to the second embodiment of the present invention.

As shown in FIG. 5, the circulating water/absorbent heat exchanger 58b is provided in the rich solution line 21d for supplying the rich solution 104b of the absorbent 104 having absorbed $CO_2$ in the absorber 2 to the regenerator 3. More specifically, the circulating water/absorbent heat exchanger 58b is provided between the rich/lean heat exchanger 4 and the regenerator 3 in the rich solution line 21d. The circulating water 107 is supplied to the circulating water/absorbent heat exchanger 58b by the circulating water line 58c. That is, the circulating water 107 is circulated by the circulating water line 58c through the circulating water/flue gas heat exchanger 58a and the circulating water/absorbent heat exchanger 58b.

Meanwhile, in the circulating water/flue gas heat exchanger 58a (circulating water/flue gas heat exchanging step), the circulating water 107 circulated by the circulating water line 58c (the signs C and D in FIGS. 4 and 5) is heated by-heat exchanging the circulating water 107 with the flue gas 101 in the flue gas duct 51 in the combustion facility 50. Furthermore, in the circulating water/absorbent heat exchanger 58b (circulating water/absorbent heat exchanging step), the rich solution 104b of the absorbent 104 having absorbed $CO_2$ in the absorber 2 is heated by heat-exchanging the rich solution 104b with the circulating water 107 circulated by the circulating water line 58c (the signs C and D in FIGS. 4 and 5).

As described above, the $CO_2$ recovery unit 53 according to the present embodiment includes the circulating water/flue gas heat exchanger 58a that heats the circulating water 107 by heat-exchanging it with the flue gas 101 in the flue gas duct 51 in the combustion facility 50 in the downstream of the flue gas 101 of the condensed water/flue gas heat exchanger 57, and the circulating water/absorbent heat exchanger 58b that heats the rich solution 104b of the absorbent 104 having absorbed $CO_2$ in the absorber 2 by heat-exchanging the rich solution 104b with the circulating water 107 before reaching the regenerator 3.

According to the $CO_2$ recovery unit 53, the rich solution 104b of the absorbent 104 is heated before reaching the regenerator 3 by using the heat of the flue gas 101. Therefore, an amount of steam required by the regenerating heater 32 for heating the rich solution 104b of the absorbent 104 can be reduced, and thus consumption energy in the combustion facility 50 required for recovering $CO_2$ can be reduced, thereby enabling to improve energy efficiency in the plant 5 in which the $CO_2$ recovery unit 53 is applied.

As shown in FIG. 4, in the $CO_2$ recovery unit 53 according to the second embodiment, an on-off valve 58d can be provided in the circulating water line 58c for circulating the circulating water 107. When the on-off valve 58d is opened, the circulating water 107 is circulated, thereby performing heat exchange between the circulating water 107 and the flue gas 101, and between the rich solution 104b of the absorbent 104 and the circulating water 107. On the other hand, when the on-off valve 58d is closed, the circulating water 107 is not circulated. Therefore, the circulating water 107 and the flue gas 101 are not heat-exchanged, and the rich solution 104b of the absorbent 104 and the circulating water 107 are not heat-exchanged.

According to the $CO_2$ recovery unit 53, for example, when there is a load variation in at least one of the plant 5 and the $CO_2$ recovery unit 53, the heat exchange amount in the circulating water/flue gas heat exchanger 58a and the circulating water/absorbent heat exchanger 58b can be adjusted by operating the on-off valve 58d. Accordingly, a stable operation can be performed even at the time of the load variation.

The $CO_2$ recovery method according to the second embodiment includes a circulating water/flue gas heat exchanging step of heating the circulating water 107 by heat-exchanging it with the flue gas 101 in the flue gas duct 51 in the combustion facility 50 in the downstream of the flue gas 101 at the condensed water/flue gas heat exchanging step, and a circulating water/absorbent heat exchanging step of heating the rich solution 104b of the absorbent 104 having absorbed $CO_2$ at a $CO_2$ absorbing step by heat-exchanging the rich solution 104b with the circulating water 107 before performing an absorbent regenerating step.

According to the $CO_2$ recovery method, the rich solution 104b of the absorbent 104 is heated by using the heat of the flue gas 101 before performing the absorbent regenerating step. Therefore, an amount of steam required by a regeneration heating step for heating the rich solution 104b of the absorbent 104 can be reduced, and thus consumption energy in the combustion facility 50 required for recovering $CO_2$ can be reduced, thereby enabling to improve energy efficiency in the plant 5 in which the $CO_2$ recovery method is applied.

As shown in FIG. 4, the $CO_2$ recovery method according to the second embodiment further includes a non-heat exchanging step of stopping the heat exchange at the circulating water/flue gas heat exchanging step and the circulating water/absorbent heat exchanging step by closing the on-off valve 58d.

According to the $CO_2$ recovery method, for example, when there is a load variation in at least one of the plant 5 and the $CO_2$ recovery unit 53, the heat exchange amount at the circulating water/flue gas heat exchanging step and the circulating water/absorbent heat exchanging step can be adjusted by operating the on-off valve 58d. Accordingly, a stable operation can be performed even at the time of the load variation.

In FIG. 4, which explains the present embodiment, a configuration including the circulating water/flue gas heat exchanger 58a (circulating water/flue gas heat exchanging step) and the circulating water/absorbent heat exchanger 58b (circulating water/absorbent heat exchanging step) is shown with respect to the configuration shown in FIG. 3, which explains the first embodiment. However, the circulating water/flue gas heat exchanger 58a (circulating water/flue gas heat exchanging step) and the circulating water/absorbent heat exchanger 58b (circulating water/absorbent heat exchanging step) can be provided in the configuration shown in FIG. 1, which explains the first embodiment.

Third Embodiment

Figure 6:
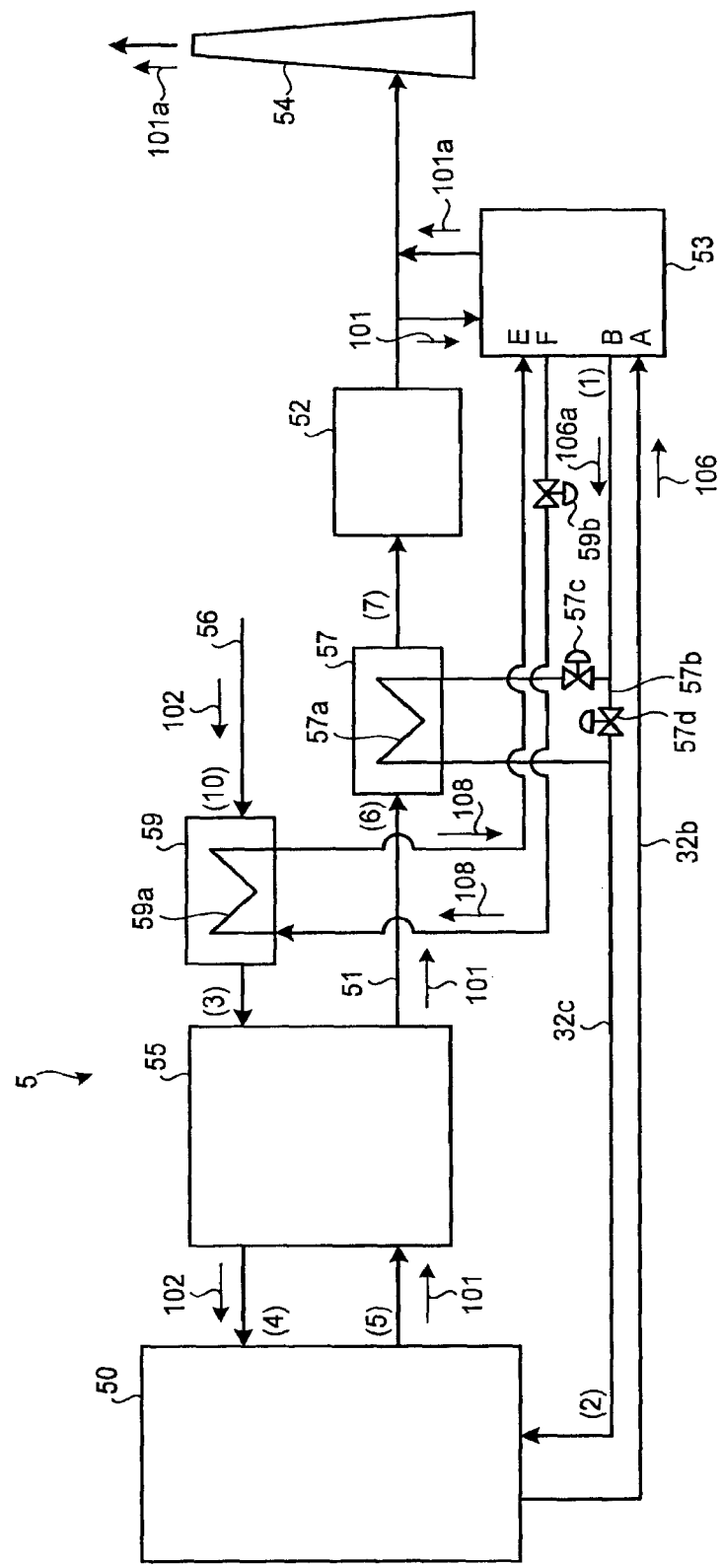
FIG. 6 is a schematic diagram of a plant in which a $CO_2$ recovery unit according to a third embodiment of the present invention is applied.

A third embodiment of the present invention is explained with reference to the drawings. FIG. 6 is a schematic diagram of a plant in which a $CO_2$ recovery unit according to the third embodiment is applied.

The $CO_2$ recovery unit 53 according to the present embodiment includes the condensed water/flue gas heat exchanger 57 (in a $CO_2$ recovery method, condensed water/flue gas heat exchanging step), similarity to the $CO_2$ recovery unit 53 according to the first embodiment. The $CO_2$ recovery unit 53 further includes an air preheater 59 (in the $CO_2$ recovery method, air preheating step). Therefore, in the third embodiment, a configuration of the air preheater 59 (in the $CO_2$ recovery method, air preheating step) is explained, and elements equivalent to those in the first embodiment described above are denoted by like reference signs and explanations thereof will be omitted.

As shown in FIG. 6, the air preheater 59 has a heat discharge line 59a. The heat discharge line 59a is provided to circulate a heat medium 108 such as circulating water between the air line 56 in an upstream of air of the air/flue gas heat exchanger 55 and a cooler that discharges heat in a process of recovering $CO_2$ in the $CO_2$ recovery unit 53. As shown in FIG. 2 (or in FIG. 5), the cooler that discharges waste heat in the process of recovering $CO_2$ in the $CO_2$ recovery unit 53 includes at least one of the cooler 1e provided in the cooling water line 1b of the cooling column 1, the cooler 22f provided in the wash water line 22e of the absorber 2, the cooler 31e provided in the lean solution line 31d extending from the regenerator 3 to the absorber 2, and the cooler 33b provided in a $CO_2$ emission line 33a of a $CO_2$ recovering unit 33. That is, the heat medium 108 is circulated by the waste heat line 59a through the air line 56 and the coolers 1e, 22f, 31e, and 33b.

Meanwhile, in the air preheater 59 (air preheating step), the combustion air 102 in the air line 56 is preheated by heat-exchanging the combustion air 102 with the heat medium 108 circulating through the waste heat line 59a (the signs E and F in FIG. 2 (in FIG. 5) and FIG. 6).

As described above, the $CO_2$ recovery unit 53 according to the third embodiment includes the air preheater 59 that preheats the combustion air 102 before reaching the combustion facility 50 by waste heat discharged in the process of recovering $CO_2$.

According to the $CO_2$ recovery unit 53, the combustion air 102 is preheated by using waste heat discharged in the process of recovering $CO_2$. Therefore, the temperature of the flue gas 101 discharged from the boiler in the combustion facility 50 rises, thereby increasing the heat exchange amount in the condensed water/flue gas heat exchanger 57. As a result, the temperature of the condensed water 106a returned from the regenerating heater 32 to the combustion facility 50 rises, thereby enabling to reduce consumption energy in the combustion facility 50 required for recovering $CO_2$, and to improve energy efficiency in the plant 5 in which the $CO_2$ recovery unit 53 is applied.

As shown in FIG. 6, in the $CO_2$ recovery unit 53 according to the third embodiment, an on-off valve 59b can be provided in the waste heat line 59a for circulating the heat medium 108. When the on-off valve 59b is opened, the heat medium 108 is circulated, thereby performing heat exchange between the heat medium 108 and the combustion air 102. On the other hand, when the on-off valve 59b is closed, the heat medium 108 is not circulated, and thus the heat medium 108 is not heat-exchanged with the combustion air 102.

According to the $CO_2$ recovery unit 53, for example, when there is a load variation in at least one of the plant 5 and the $CO_2$ recovery unit 53, the heat exchange amount in the air preheater 59 can be adjusted by operating the on-off valve 59b. Accordingly, a stable operation can be performed even at the time of the load variation.

The $CO_2$ recovery method according to the third embodiment includes the air preheating step of preheating the combustion air 102 before reaching the combustion facility 50 by waste heat discharged in the process of recovering $CO_2$.

According to the $CO_2$ recovery method, the combustion air 102 is preheated by using waste heat discharged in the process of recovering $CO_2$. Therefore, the temperature of the flue gas 101 discharged from the boiler in the combustion facility 50 rises, thereby increasing the heat exchange amount in the condensed water/flue gas heat exchanger 57. As a result, the temperature of the condensed water 106a returned from the regenerating heater 32 to the combustion facility 50 rises, thereby enabling to reduce consumption energy in the combustion facility 50 required for recovering $CO_2$, and to improve energy efficiency in the plant 5 in which the $CO_2$ recovery unit 53 is applied.

As shown in FIG. 6, the $CO_2$ recovery method according to the third embodiment further includes a non-heat exchanging step of stopping the heat exchange at the air preheating step by closing the on-off valve 59b.

According to the $CO_2$ recovery method, for example, when there is a load variation in at least one of the plant 5 and the $CO_2$ recovery unit 53, the heat exchange amount at the air preheating step can be adjusted by operating the on-off valve 59b. Accordingly, a stable operation can be performed even at the time of the load variation.

In FIG. 6, which explains the present embodiment, a configuration including the air preheater 59 (air preheating step) is shown with respect to the configuration shown in FIG. 3, which explains the first embodiment. However, the air preheater 59 (air preheating step) can be provided in the configuration shown in FIG. 1, which explains the first embodiment.

Furthermore, the configuration of the present embodiment can be a configuration included in the second embodiment.

Fourth Embodiment

Figure 7:
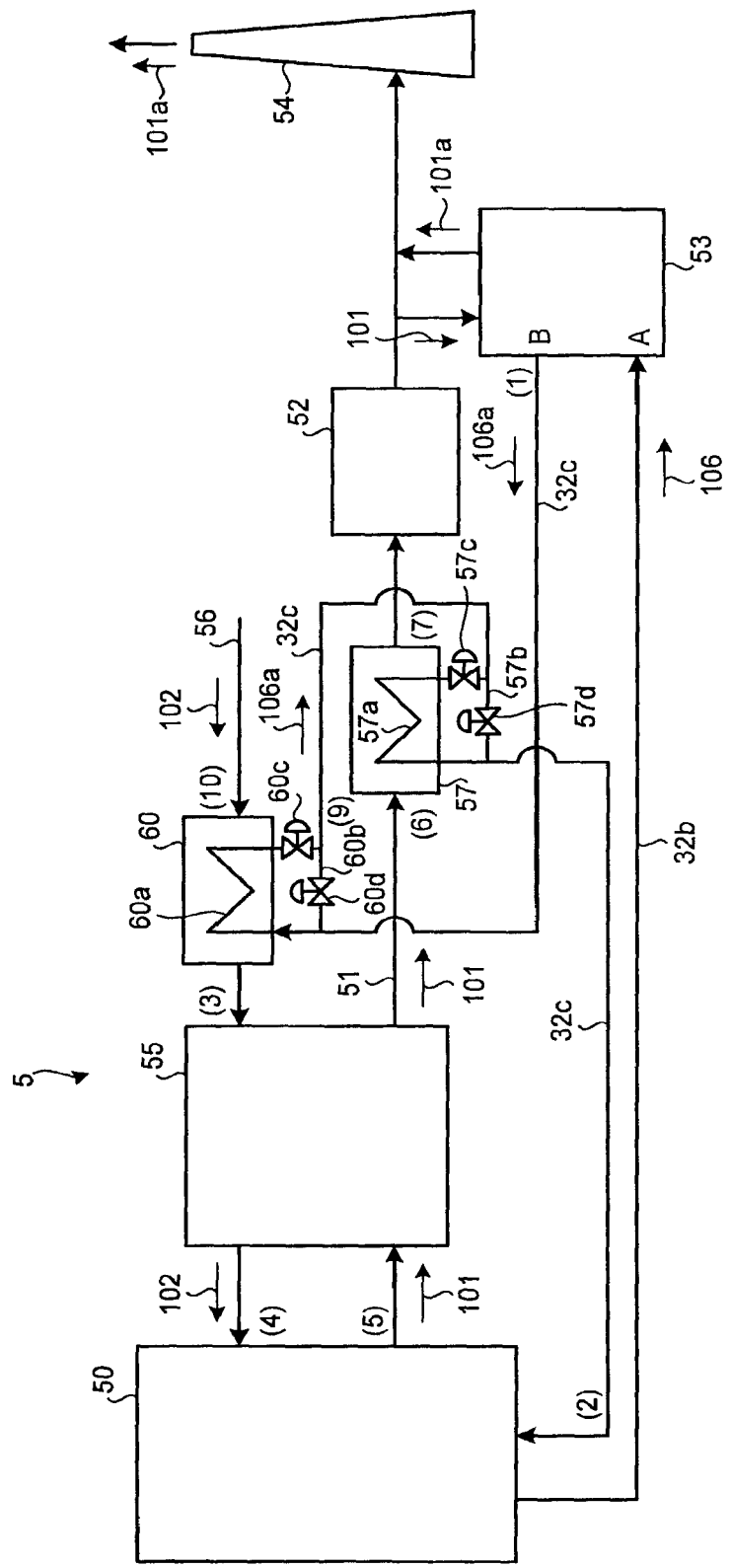
FIG. 7 is a schematic diagram of a plant in which a $CO_2$ recovery unit according to a fourth embodiment of the present invention is applied.

A fourth embodiment of the present invention is explained with reference to the drawings. FIG. 7 is a schematic diagram of a plant in which a $CO_2$ recovery unit according to the fourth embodiment is applied.

The $CO_2$ recovery unit 53 according to the present embodiment includes the condensed water/flue gas heat exchanger 57 (in a $CO_2$ recovery method, condensed water/flue gas heat exchanging step), similarly to the $CO_2$ recovery unit 53 according to the first embodiment. The $CO_2$ recovery unit 53 further includes an air preheater 60 (in the $CO_2$ recovery method, air preheating step). Therefore, in the fourth embodiment, a configuration of the air preheater 60 (in the $CO_2$ recovery method, air preheating step) is explained, and elements equivalent to those in the first embodiment described above are denoted by like reference signs and explanations thereof will be omitted.

As shown in FIG. 7, the air preheater 60 has a condensed water/combustion air heat exchanging line 60a. The condensed water/combustion air heat exchanging line 60a is placed in the condensed water line 32c, and extended to the air line 56 in an upstream of air of the air/flue gas heat exchanger 55, so that the combustion air 102 in the air line 56 is preheated by heat-exchanging it with the condensed water 106a to be returned from the regenerating heater 32 to the combustion facility 50. Furthermore, the condensed water/flue gas heat exchanger 57 is formed in the condensed water line 32c passing through the air preheater 60.

As described above, the $CO_2$ recovery unit 53 according to the fourth embodiment includes the air preheater 60 that preheats the combustion air 102 before reaching the combustion facility 50 by the condensed water 106a before reaching the condensed water/flue gas heat exchanger 57.

According to the $CO_2$ recovery unit 53, the combustion air 102 is preheated by using the condensed water 106a before reaching the condensed water/flue gas heat exchanger 57. Therefore, the temperature of the flue gas 101 discharged from the boiler in the combustion facility 50 rises, thereby increasing the heat exchange amount in the condensed water/flue gas heat exchanger 57. As a result, the temperature of the condensed water 106a returned from the regenerating heater 32 to the combustion facility 50 increases, thereby enabling to reduce consumption energy in the combustion facility 50 required for recovering $CO_2$, and to improve energy efficiency in the plant 5 in which the $CO_2$ recovery unit 53 is applied.

In the $CO_2$ recovery unit 53 according to the fourth embodiment, a bypass line 60b that directly connects the condensed water line 32c without via the condensed water/combustion air heat exchanging line 60a is provided in the condensed water line 32c for returning the condensed water 106a from the regenerating heater 32 to the combustion facility 50. Furthermore, an on-off valve 60c is provided on a downstream side of the condensed water/combustion air heat exchanging line 60a for feeding the condensed water 106a to the air preheater 60. Further, an on-off valve 60d is provided in the bypass line 60b.

When heat exchange between the condensed water 106a and the combustion air 102 is to be performed by the air preheater 60, the on-off valve 60c is opened and the on-off valve 60d is closed. With this configuration, the condensed water 106a in the process of being returned to the combustion facility 50 via the condensed water line 32c passes through the condensed water/combustion air heat exchanging line 60a. Therefore, heat exchange between the condensed water 106a and the combustion air 102 is performed in the air preheater 60.

On the other hand, when heat exchange between the condensed water 106a and the combustion air 102 is not performed in the air preheater 60, the on-off valve 60c is closed, and the on-off valve 60d is opened. With this configuration, the condensed water 106a in the process of being returned to the combustion facility 50 via the condensed water line 32c is returned to the combustion facility 50 without via the condensed water/combustion air heat exchanging line 60a. Therefore, heat exchange between the condensed water 106a and the combustion air 102 is not performed in the air preheater 60 (non-heat exchanging step).

As described above, in the $CO_2$ recovery unit 53 according to the fourth embodiment, the condensed water/combustion air heat exchanging line 60a for performing heat exchange between the condensed water 106a and the combustion air 102 is provided in the middle of the condensed water line 32c for returning the condensed water 106a from the regenerating heater 32 to the combustion facility 50, and the bypass line 60b for directly connecting the condensed water line 32c without via the condensed water/combustion air heat exchanging line 60a is provided.

According to the $CO_2$ recovery unit 53, for example, when there is a load variation in at least one of the plant 5 and the $CO_2$ recovery unit 53, the heat exchange amount between the condensed water 106a and the combustion air 102 in the air preheater 60 can be adjusted by the bypass line 60b. Accordingly, a stable operation can be performed even at the time of the load variation.

The $CO_2$ recovery method according to the fourth embodiment includes the air preheating step of preheating the combustion air 102 before reaching the combustion facility 50 by the condensed water 106a, before performing the condensed water/flue gas heat exchanging step.

According to the $CO_2$ recovery method, the combustion air 102 is preheated by using the condensed water 106a before reaching the condensed water/flue gas heat exchanging step. Therefore, the temperature of the flue gas 101 discharged from the boiler in the combustion facility 50 rises, thereby increasing the heat exchange amount in the condensed water/flue gas heat exchanger 57. As a result, the temperature of the condensed water 106a returned from the regenerating heater 32 to the combustion facility 50 rises, thereby enabling to reduce consumption energy in the combustion facility 50 required for recovering $CO_2$, and to improve energy efficiency in the plant 5 in which the $CO_2$ recovery unit 53 is applied.

The $CO_2$ recovery method according to the fourth embodiment includes the non-heat exchanging step of returning the condensed water 106a to the combustion facility 50 without via the air preheating step.

According to the $CO_2$ recovery method, for example, when there is a load variation in at least one of the plant 5 and the $CO_2$ recovery unit 53, the heat exchange amount between the condensed water 106a and the flue gas 101 at the condensed water/flue gas heat exchanging step can be adjusted by the non-heat exchanging step. Accordingly, a stable operation can be performed even at the time of the load variation.

In FIG. 7, which explains the present embodiment, a configuration including the air preheater 60 (air preheating step) is shown with respect to the configuration shown in FIG. 3, which explains the first embodiment. However, the air preheater 60 (air preheating step) can be provided in the configuration shown in FIG. 1, which explains the first embodiment.

Furthermore, the configuration of the present embodiment can be a configuration included in the second embodiment.

EXAMPLES

Examples showing effects of the present invention are explained below, while the present invention is not limited thereto. FIG. 8 depicts a power output reduction rate of a process in which the method of the present invention is applied to a coal-combustion thermal power generating facility with a generating capacity of 900 megawatts.

As a comparative example, a conventional technique in which any condensed water/flue gas heat exchanger is not provided and condensed water is directly returned to a combustion facility is exemplified as a comparative example 1. An Example 1 has the configuration of the first embodiment shown in FIGS. 1 to 3. An Example 2 has the configuration of the second embodiment shown in FIGS. 4 and 5. An Example 3 has the configuration of the third embodiment shown in FIG. 6. An Example 4 has the configuration of the fourth embodiment shown in FIG. 7.

Positions at an outlet of the $CO_2$ recovery unit (1), a condensed water outlet of the air preheater (9), a condensed water inlet of the combustion facility (2), a flue gas inlet of the air preheater (10), an air inlet of the air/flue gas heat exchanger (3), an air inlet of the combustion facility (4), a flue gas outlet of the combustion facility (5), a flue gas inlet of the condensed water/flue gas heat exchanger (6), a flue gas outlet of the condensed water/flue gas heat exchanger (7), and a flue gas outlet of the circulating water/flue gas heat exchanger (8) shown in FIG. 8 are indicated by like numbers in brackets in FIG. 1, FIG. 3, FIG. 4, FIG. 6, and FIG. 7 corresponding to each of the Examples.

Because the comparative example 1 does not include the condensed water/flue gas heat exchanger, the condensed water temperature at the outlet of the $CO_2$ recovery unit (1) and that at the condensed water inlet of the combustion facility (2) are both 100 [° C.], and therefore the power output becomes 791 [MW]. The reduction in the power output in the comparative example 1 is 12.1%.

On the other hand, because the Example 1 includes the condensed water/flue gas heat exchanger 57, the condensed water temperature at the condensed water inlet of the combustion facility (2) is heated to 126 [° C.] with respect to the condensed water temperature 100 [° C.] at the outlet of the $CO_2$ recovery unit (1). Accordingly, the reduction in the power output was smaller than that in the comparative example 1, and was 11.6%.

The Example 2 includes the circulating water/flue gas heat exchanger 58a and the circulating water/absorbent heat exchanger 58b, in addition to the condensed water/flue gas heat exchanger 57. Therefore, the condensed water temperature at the condensed water inlet of the combustion facility (2) was heated to 126 [° C.] with respect to the condensed water temperature 100 [° C.] at the outlet of the $CO_2$ recovery unit (1), and the rich solution 104b of the absorbent 104 was heated to 93.8 [° C.] by the circulating water/flue gas heat exchanger 58a and the circulating water/absorbent heat exchanger 58b. Accordingly, the reduction in the power output was smaller than that in the comparative example 1, and was 11.3%.

The Example 3 includes the air preheater 59 according to the third embodiment shown in FIG. 6, in addition to the condensed water/flue gas heat exchanger 57. Therefore, the condensed water temperature at the condensed water inlet of the combustion facility (2) was heated to 154 [° C.] with respect to the condensed water temperature 100 [° C.] at the outlet of the $CO_2$ recovery unit (1). Accordingly, the reduction in the power output was smaller than that in the comparative example 1, and was 10.8%.

The Example 4 includes the air preheater 60 according to the fourth embodiment shown in FIG. 7, in addition to the condensed water/flue gas heat exchanger 57. Therefore, the condensed water temperature at the condensed water inlet of the combustion facility (2) was heated to 157 [° C.] with respect to the condensed water temperature 100 [° C.] at the outlet of the $CO_2$ recovery unit (1). Accordingly, the reduction in the power output was smaller than that in the comparative example 1, and was 10.8%.

As a result, as shown in FIG. 8, according to these Examples, it can be understood that energy efficiency in the combustion facility can be improved because the power output is improved.

REFERENCE SIGNS LIST 1 cooling column
1e cooler
2 absorber
22f cooler
3 regenerator
31 absorbent regenerating unit
31e cooler
32 regenerating heater
32a heating line
32b steam extracting line
32c condensed water line
33 $CO_2$ recovering unit
33b cooler
34 lean solution/condensed water heat recovery unit
4 rich/lean heat exchanger
5 plant
50 combustion facility
51 flue gas duct
52 desulfurizer
53 $CO_2$ recovery unit
54 stack
55 air/flue gas heat exchanger
56 air line
57 condensed water/flue gas heat exchanger
58a circulating water/flue gas heat exchanger
58b circulating water/absorbent heat exchanger
59 air preheater
60 air preheater
101 flue gas
101a emission gas
102 combustion air
103 cooling water
104 absorbent
104a lean solution
104b rich solution
105 wash water
106 steam
106a condensed water
107 circulating water
108 heat medium

The invention claimed is:

1. An operation method of a plant comprising:
a combustion step that discharges flue gas to a flue gas duct and heats condensed water from a condensed water line so as to discharge the heated condensed water to a steam extracting line as steam;
an air/flue gas heat exchanging step that heat-exchanges the flue gas with combustion air;
a CO2 recovery step including:
an absorbing step that reduces $CO_2$ in flue gas discharged from the combustion step via the air/flue gas heat exchanging step by absorbing $CO_2$ by an absorbent;
a regeneration step that heats the absorbent having absorbed $CO_2$ to emit $CO_2$, and regenerates and supplies the absorbent to the absorbing step; and
a regenerating heat step that heats the absorbent in the regeneration step with the steam from the steam extracting line and returns heated condensed water to the combustion step via the condensed water line; and
a condensed water/flue gas heat exchanging step that heats the condensed water of the condensed water line by heat-exchanging the condensed water with the flue gas in the flue gas duct discharged from the air/flue gas heat exchanging step.

2. The method according to claim 1, further comprising:
a bypass step of directly supplying the condensed water of the condensed water line without via the condensed water/flue gas heat exchanging step.

3. The method according to claim 1, further comprising:
a circulating water/flue gas heat exchanging step that performs heat exchange between circulating water and the flue gas in the flue gas duct after the condensed water/flue gas heat exchanging step; and
a circulating water/absorbent heat exchanging step that performs heat exchange between the absorbent having absorbed $CO_2$ in the absorbing step and the circulating water before the absorbent reaches the regeneration step.

4. The method according to claim 1, further comprising an air preheating step that preheats the combustion air before the combustion step by waste heat discharged in a process of $CO_2$ recovery step.

5. The method according to claim 1, further comprising an air preheater that preheats the combustion air before reaching the combustion step by the condensed water before reaching the condensed water/flue gas heat exchanging step.

* * * * *